United States Patent
Tang (10) Patent No.: US 10,747,034 B2
(45) Date of Patent: Aug. 18, 2020

(54) LIQUID CRYSTAL DISPLAY PANEL WITH ADJUSTABLE VIEWING ANGLE AND METHOD FOR ADJUSTING THE VIEWING ANGLE THEREOF

(71) Applicants: Shenzhen China Star Optoelectronics Technology Co., Ltd., Shenzhen (CN); Wuhan China Star Optoelectronics Technology Co., Ltd., Wuhan (CN)

(72) Inventor: Yuejun Tang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 280 days.

(21) Appl. No.: 14/907,946

(22) PCT Filed: Nov. 24, 2015

(86) PCT No.: PCT/CN2015/095398
§ 371 (c)(1),
(2) Date: Nov. 15, 2017

(87) PCT Pub. No.: WO2017/070996
PCT Pub. Date: May 4, 2017

(65) Prior Publication Data
US 2018/0067345 A1    Mar. 8, 2018

(30) Foreign Application Priority Data
Oct. 28, 2015   (CN) .......................... 2015 1 0713568

(51) Int. Cl.
*G02F 1/133*    (2006.01)
*G02F 1/13*    (2006.01)
(Continued)

(52) U.S. Cl.
CPC ............ *G02F 1/1323* (2013.01); *G02F 1/137* (2013.01); *G02F 1/13306* (2013.01);
(Continued)

(58) Field of Classification Search
None
See application file for complete search history.

(56) References Cited

FOREIGN PATENT DOCUMENTS

| CN | 104181736 A | * | 12/2014 | ....... G02F 1/134363 |
|----|-------------|---|---------|----------------------|
| CN | 104460138 A | * | 3/2015  | ......... G02F 1/13439 |

\* cited by examiner

*Primary Examiner* — Richard H Kim
(74) *Attorney, Agent, or Firm* — Nelson Mullins Riley & Scarborough LLP; Kongsik Kim, Esq.

(57) ABSTRACT

Disclosed are a liquid crystal display panel with adjustable viewing angle and a method for adjusting the viewing angle. A pixel unit located in a display area of the liquid crystal display panel includes a main pixel area and a sub pixel area. The main pixel area is horizontally aligned. The sub pixel area is vertically aligned. In the sub pixel area, an upper substrate electrode is arranged beneath the upper substrate and a lower substrate electrode is arranged on the lower substrate. In the sub pixel area, the upper substrate electrode and the lower substrate electrode both have a double layer electrode structure, and bias voltages, under an action of which liquid crystal molecules in the sub pixel area are aligned horizontally, vertically and obliquely, are exerted on the upper substrate electrode and the lower substrate electrode, thereby realizing switching between a narrow viewing angle mode and a wide viewing angle mode.

10 Claims, 3 Drawing Sheets

(51) Int. Cl.
*G02F 1/1337* (2006.01)
*G02F 1/1343* (2006.01)
*G02F 1/137* (2006.01)

(52) U.S. Cl.
CPC .. *G02F 1/133753* (2013.01); *G02F 1/134363* (2013.01); *G02F 2001/134381* (2013.01); *G02F 2201/121* (2013.01); *G02F 2201/123* (2013.01)

LIQUID CRYSTAL DISPLAY PANEL WITH ADJUSTABLE VIEWING ANGLE AND METHOD FOR ADJUSTING THE VIEWING ANGLE THEREOF

CROSS-REFERENCE TO RELATED APPLICATIONS

The present application claims benefit of Chinese patent application CN201510713568.2, entitled "Liquid Crystal Display Panel with Adjustable Viewing Angle and Method for Adjusting the Viewing Angle Thereof", and filed on Oct. 28, 2015, the entirety of which is incorporated herein by reference.

FIELD OF THE INVENTION

The present disclosure relates to the technical field of display, and particularly to a liquid crystal display panel with adjustable viewing angle and a method for adjusting the viewing angle thereof.

BACKGROUND OF THE INVENTION

A viewing angle range (hereinafter referred to as viewing angle) is an important performance index of a liquid crystal display panel. In the liquid crystal display panel, a polarization state of light can be changed through regulating an alignment of liquid crystal molecules. In this manner, a flux between an upper polarizer layer and a lower polarizer layer can be controlled, and the display function can be realized. Due to the influence of optical anisotropy of the liquid crystal molecules, the viewing angle of the liquid crystal display device is smaller than that of a cathode-ray tube display device. With the development of technology, in order to enlarge the viewing angle of the liquid crystal display device, multi-domain vertical alignment (MVA) mode, in-plane switching (IPS) mode, and fringe field switching (FFS) mode have been brought about successively, and wide viewing angle display of the liquid crystal display device has been realized.

Although wide viewing angle has become the trend for the development of liquid crystal display device, under certain circumstances, it is required that the liquid crystal display device has the function of switching between wide viewing angle and narrow viewing angle. As to portable electronic devices using liquid crystal display, such as cell phones, palmtops, and laptops, such requirement is especially urgent. For example, there are times when the user needs to share images on the portable electronic device with others and there are other times when he/she does not want others to see the images on the portable electronic device for the privacy sake. Therefore, it is necessary to provide a liquid crystal display panel with adjustable viewing angle.

In the prior art, in order to realize switching between wide viewing angle and narrow viewing angle, the following solutions are proposed.

1. Using shutter barrier film. When it is hoped that the liquid crystal panel displays images under narrow viewing angle, the user places the shutter barrier film on the screen of the liquid crystal display panel. Such approach requires the user to carry the shutter barrier film along, and thus is very inconvenient to operate.

2. Using double backlight system. In a double backlight system, a common backlight system is used to realize a wide angle display and another alignment backlight system is used to realize narrow angle display. However, in such method, the production cost, thickness and the energy consumption of the liquid crystal display panel will be increased undoubtedly.

3. Using asymmetrical electrodes, i.e., combining asymmetrical electrodes with corresponding driving methods. In such method, multiple electrode drivers are generally needed, which are complicated to be realized.

Figure 1:
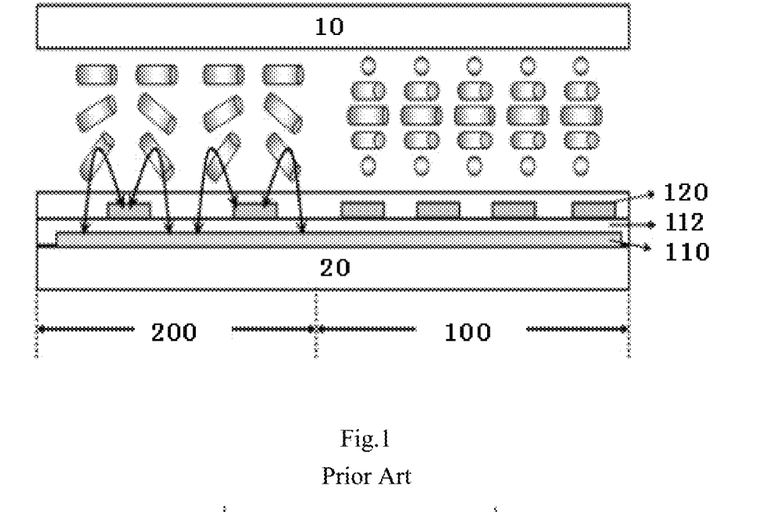
FIG. 1 schematically shows deflection of liquid crystal molecules under an electric field action in a liquid crystal display panel adopting two-phase pixel technology in the prior art.

The abovementioned liquid crystal display panel cannot satisfy requirements for portable electronic devices in both aspects of size and power consumption. In the prior art, there are liquid crystal display panels that adopt two-phase pixel technology, which enables liquid crystal molecules to deflect to a certain angle by controlling the voltage of the electrode on the lower substrate, so as to realize switching between the wide viewing angle mode and the narrow viewing angle mode. FIG. 1 schematically shows a deflection of liquid crystal molecules under an action of an electric field in the liquid crystal display panel. A liquid crystal layer is arranged between an upper substrate 10 and a lower substrate 20, and pixel units are divided into a main pixel area 100 and a sub pixel area 200. A planar common electrode 110 and a bar-shaped pixel electrode 120 are arranged on the lower substrate corresponding to the two pixel areas, and an insulation layer 112 is arranged between the common electrode 110 and the pixel electrode 120 as a barrier. Electric field generated from different voltages on the common electrode 110 and the pixel electrode 120 will act on the liquid crystal molecules. However, the electric field generated as such is rather weak, and thus a viewing angle control effect obtained therein is poor.

The present disclosure proposes a new liquid crystal display panel with an adjustable viewing angle and a method for controlling the viewing angle so as to satisfy the demand of portable electronic device for circuit stability, weight and power consumption thereof.

SUMMARY OF THE INVENTION

Directed at the abovementioned problems, the present disclosure provides a new liquid crystal display panel with an adjustable viewing angle and a method for controlling the viewing angle.

The present disclosure provides a liquid crystal display panel with adjustable viewing angle, which comprises an upper substrate, a lower substrate, and a liquid crystal layer therebetween. A pixel unit located in a display area comprises a main pixel area and a sub pixel area. The main pixel area is horizontally aligned, while the sub pixel area is vertically aligned. In the sub pixel area, an upper substrate electrode is arranged beneath the upper substrate and a lower substrate electrode is arranged on the lower substrate. In the sub pixel area, the upper substrate electrode and the lower substrate electrode both have a double layer electrode structure and are configured symmetrical with respect to each other, and bias voltages, under an action of which liquid crystal molecules in the sub pixel area are aligned horizontally, vertically and obliquely, are exerted on the upper substrate electrode and the lower substrate electrode, thereby realizing switching between a narrow viewing angle mode and a wide viewing angle mode.

According to an example of the present disclosure, the double layer electrode structure of the upper substrate electrode comprises a first upper substrate electrode, an insulation layer and a second upper substrate electrode arranged beneath the upper substrate; the double layer electrode structure of the lower substrate electrode comprises a first lower substrate electrode, an insulation layer and a second lower substrate electrode arranged on the lower substrate; and the first upper substrate electrode and the first lower substrate electrode are both planar electrodes, and the second upper substrate electrode and the second lower substrate electrode are both bar-shaped electrodes.

Further, under the wide viewing angle mode, in the sub pixel area, bias voltages are exerted on the upper substrate electrode and the lower substrate electrode, so as to form an electric field between the upper substrate electrode and the lower substrate electrode having a strong enough horizontal component, thereby enabling the liquid crystal molecules in the sub pixel area to be aligned horizontally.

According to other examples of the present disclosure, under the wide viewing angle mode, a first bias voltage is exerted on a first upper substrate electrode and a first lower substrate electrode, and a second bias voltage is exerted on a second upper substrate electrode and a second lower substrate electrode.

Further, under the narrow viewing angle mode, if an initial state of the liquid crystal molecules in the sub pixel area is vertical alignment, it is unnecessary to exert bias voltages on the upper substrate electrode and the lower substrate electrode; and if the initial state of the liquid crystal molecules in the sub pixel area is oblique alignment, bias voltages are exerted on the upper substrate electrode and the lower substrate electrode, so as to form an electric field between the upper substrate electrode and the lower substrate electrode having a strong enough vertical component, thereby enabling the liquid crystal molecules in the sub pixel area to be aligned vertically.

According to an example of the present disclosure, under the narrow viewing angle mode, if the initial state of the liquid crystal molecules in the sub pixel area is oblique alignment, a third bias voltage is exerted on the first upper substrate electrode and the second upper substrate electrode, and a fourth bias voltage is exerted on the first lower substrate electrode and the second lower substrate electrode.

In addition, the present disclosure further provides a method for adjusting a viewing angle of a liquid crystal display panel. A pixel unit in a display area of the liquid crystal display panel comprises a main pixel area and a sub pixel area. The main pixel area is horizontally aligned, while the sub pixel area is vertically aligned. In the sub pixel area, an upper substrate electrode is arranged beneath an upper substrate and a lower substrate electrode is arranged on a lower substrate. In the sub pixel area, the upper substrate electrode and the lower substrate electrode both have a double layer electrode structure and are configured symmetrical with respect to each other. The method for adjusting the viewing angle comprises steps of: controlling bias voltages exerted on the upper substrate electrode and the lower substrate electrode, so that liquid crystal molecules in the sub pixel area are aligned horizontally, vertically and obliquely, thereby realizing switching between a narrow viewing angle mode and a wide viewing angle mode.

Further, when a wide viewing angle mode is selected, bias voltages are exerted on the upper substrate electrode and the lower substrate electrode in the sub pixel area, so as to form an electric field between the upper substrate electrode and the lower substrate electrode having a strong enough horizontal component, thereby enabling the liquid crystal molecules in the sub pixel area to deflect to a horizontal state under an action thereof.

According to other examples of the present disclosure, when the wide viewing angle mode is selected, a first bias voltage is exerted on a first upper substrate electrode and a first lower substrate electrode, and a second bias voltage is exerted on a second upper substrate electrode and a second lower substrate electrode. The first upper substrate electrode and the second upper substrate electrode are disposed beneath the upper substrate in sequence, the first lower substrate electrode and the second lower substrate electrode are disposed on the lower substrate in sequence, and an insulation layer is disposed between the first upper substrate electrode and the second upper substrate electrode and between the first lower substrate electrode and the second lower substrate electrode.

Further, when a narrow viewing angle mode is selected, if an initial state of liquid crystal molecules in the sub pixel area is vertical alignment, it is unnecessary to exert bias voltages on the upper substrate electrode and the lower substrate electrode. When the narrow viewing angle mode is selected, if the initial state of the liquid crystal molecules in the sub pixel area is oblique alignment, bias voltages are exerted on the upper substrate electrode and the lower substrate electrode of the sub pixel area, so as to form an electric field between the upper substrate electrode and the lower substrate electrode having a strong enough vertical component, thereby enabling the liquid crystal molecules in the sub pixel area to deflect to a vertical state.

According to an example of the present disclosure, when the narrow viewing angle mode is selected, if the initial state of the liquid crystal molecules in the sub pixel area is oblique alignment, a third bias voltage is exerted on the first upper substrate electrode and the second upper substrate electrode, and a fourth bias voltage is exerted on the first lower substrate electrode and the second lower substrate electrode. The first upper substrate electrode and the second upper substrate electrode are disposed beneath the upper substrate in sequence, the first lower substrate electrode and the second lower substrate electrode are disposed on the lower substrate in sequence, and the insulation layer is disposed between the first upper substrate electrode and the second upper substrate electrode and between the first lower substrate electrode and the second lower substrate electrode.

Compared with the prior art, the present disclosure has the following advantages.

The upper substrate electrode and the lower substrate electrode of the sub pixel area are improved and modified as double layer electrode structure according to the present disclosure, so as to form a horizontal or a vertical electric field, which enable the liquid crystal molecules in the sub pixel area to form horizontal, vertical or oblique alignment, thereby realizing switching between the wide viewing angle mode and the narrow viewing angle mode. Compared with the prior art, in the technical solution according to the present disclosure, a better technical effect and a more stable performance can be obtained.

Other features and advantages of the present disclosure will be further explained in the following description, and will partly become self-evident therefrom, or be understood through the implementation of the present disclosure. The objectives and advantages of the present disclosure will be achieved through the structures specifically pointed out in the description, claims, and the accompanying drawings.

BRIEF DESCRIPTION OF THE DRAWINGS

The accompanying drawings, which constitute part of the description, are used for further understanding and illustrating the present disclosure together with the embodiments, and thus do not restrict the present disclosure. In the drawings.

DETAILED DESCRIPTION OF THE EMBODIMENTS

A liquid crystal display panel according to the present disclosure is based on hybrid alignment technology, in order to realize switching between display modes (a wide viewing angle mode and a narrow viewing angle mode). In order to further clarify an objective, technical solutions and advantages of the present disclosure, the technical solutions according to the present disclosure will be further described in view of the embodiments and the accompanying drawings.

Embodiment 1

Figure 2:
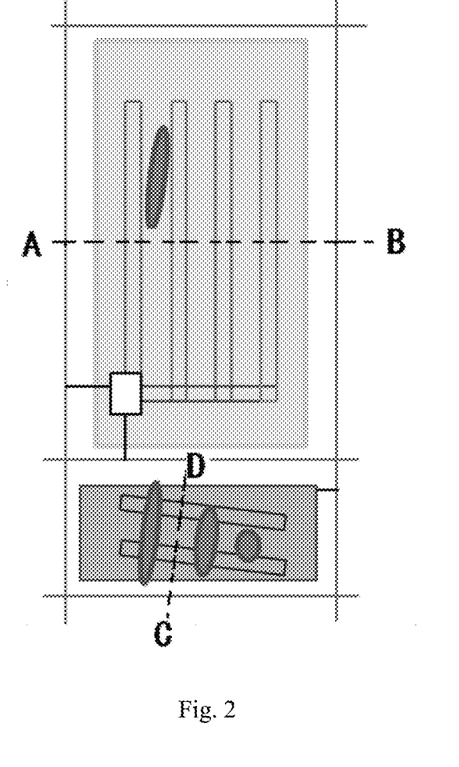
FIG. 2 shows a top view of a pixel unit (a main pixel of which is in FFS mode) in a display area of a liquid crystal display panel according to embodiment 1 of the present disclosure.

Similar to a liquid crystal display panel in the prior art, a liquid crystal display panel according to the present embodiment of the present disclosure comprises an upper substrate and a lower substrate which are parallel to each other, as well as a liquid crystal layer arranged between the upper substrate and the lower substrate. It should be noted that, the technical solution according to the present disclosure is applicable to both positive liquid crystal and blue phase liquid crystal. Therefore, liquid crystal material of the liquid crystal layer is not be defined herein. FIG. 2 shows a top view of a pixel unit in a display area of the liquid crystal display panel according to the present embodiment of the present disclosure. As shown in FIG. 2, the pixel unit in the display area is mainly divided into a main pixel area 100 and a sub pixel area 200. The main pixel area 100 is horizontally aligned and has an electrode structure based on FFS display mode. In the main pixel area 100, a plurality of bar-shaped pixel electrodes 110 is distributed on a lower substrate 20. The sub pixel area 200 is vertically aligned and has VA display mode. In the sub pixel area 200, an upper substrate electrode 210 and a lower substrate electrode 220 are disposed on the upper substrate 10 and the lower substrate 20 respectively.

Figure 3:
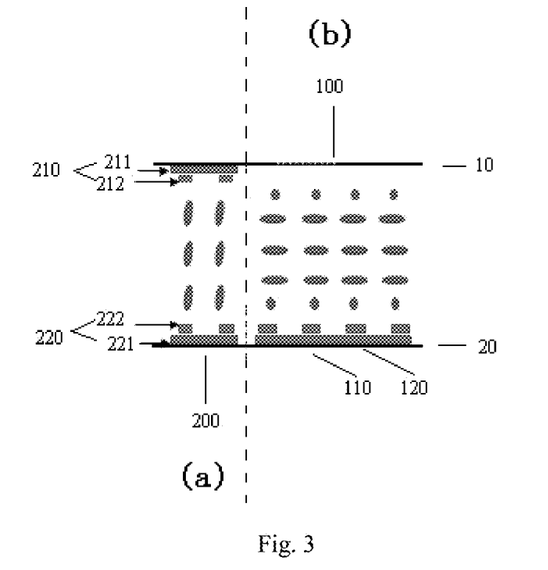
FIG. 3 schematically shows a vertical state of liquid crystal molecules under a narrow viewing angle mode of a liquid crystal display panel according to embodiment 2 of the present disclosure.

According to the present embodiment, a direction of an electrode in the main pixel area 100 is substantially vertical to a direction of an electrode in the sub pixel area 200, and an angle, such as an angle approximately 83° (not shown in the drawings), can be formed therebetween. In order to facilitate the illustration, FIG. 3 to FIG. 5 each show a sectional view of the main pixel area 100 along a dotted line AB and a sectional view of the sub pixel area 200 along a dotted line CD. For example, a left side of a dotted line in FIG. 3, i.e., region (a) in FIG. 3, shows a sectional view of the sub pixel area 200 along the dotted line CD; and a right side of the dotted line, i.e., region (b) in FIG. 3, shows a sectional view of the main pixel area 100 along the dotted line AB. However, in an actual device, the sub pixel area 200 in region (a) is not adjacent to the main pixel area 100 in the region (b) in FIG. 3 in physical structure.

Figure 4:
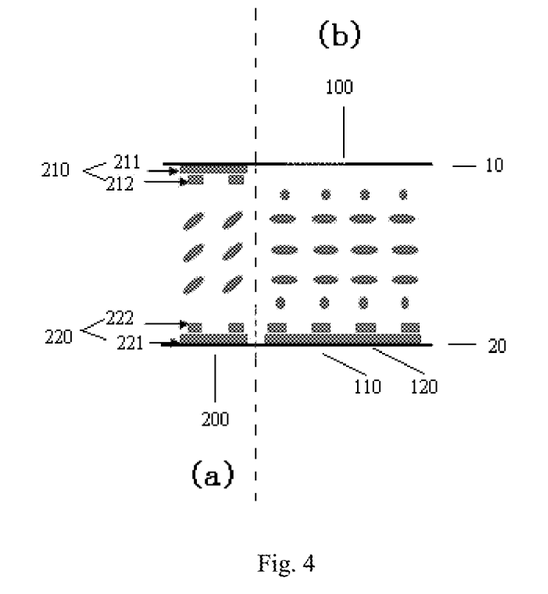
FIG. 4 schematically shows an inclined state of the liquid crystal molecules under the narrow viewing angle mode of the liquid crystal display panel according to embodiment 2 of the present disclosure.
Figure 5:
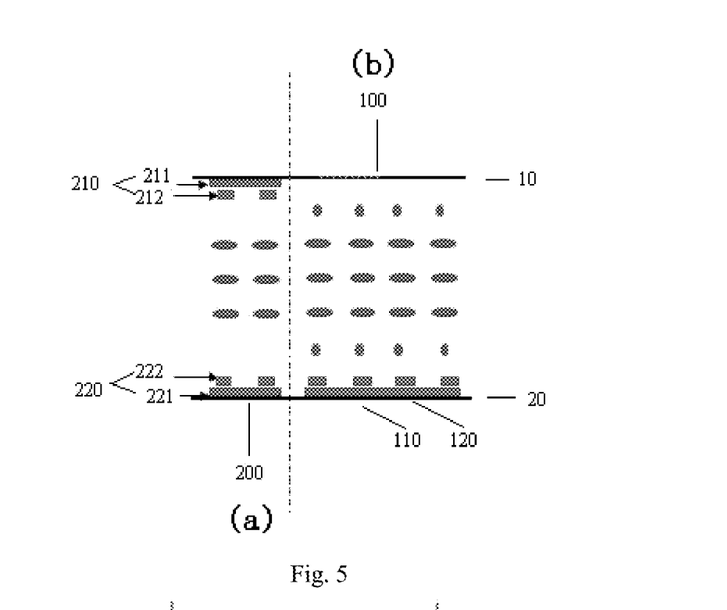
FIG. 5 schematically shows a horizontal state of the liquid crystal molecules under a wide viewing angle mode of the liquid crystal display panel according to embodiment 2 of the present disclosure.

Different from electrode in the prior art, the upper substrate electrode 210 and the lower substrate electrode 220 both have a double layer electrode structure. As shown in FIGS. 3 to 5, in the sub pixel area 200, the double layer electrode structure of the upper substrate electrode 210 is mainly comprised of a first upper substrate electrode 211, an insulation layer (not shown in the drawings), and a second upper substrate electrode 212 arranged in sequence from top to bottom; and the double layer electrode structure of the lower substrate electrode 220 is mainly comprised of a first lower substrate electrode 221, an insulation layer (not shown in the drawings), and a second lower substrate electrode 222 arranged in sequence from bottom to top. In addition, according to the present embodiment, the first upper substrate electrode 211 and the first lower substrate electrode 221 correspond to each other and both have a planar structure; and the second upper substrate electrode 212 and the second lower substrate electrode 222 correspond to each other and both have a bar-shaped structure. Such symmetrical structures can facilitate formation of symmetrical electric fields.

Similar to that in the prior art, the aforesaid electrodes can all be manufactured from transparent conductive materials. The transparent conductive materials can be one or more of ITO, IZO or IGO.

Further, in order to achieve a good display effect, color resist does not need to be arranged in the sub pixel area and an area for controlling the viewing angle.

In addition, according to the present embodiment, different liquid crystal orientations can be realized in the main pixel area and the sub pixel area through the following two methods.

1. If one same polyimide material is used to form an alignment film, the sub pixel area is first covered by a mask. After horizontal alignment (for example, through optical alignment technology) of the main pixel area is completed, vertical alignment of the sub pixel area is performed by covering the main pixel area with a mask.

2. If different polyimide materials are used to form alignment films, a rubbing procedure is not used. Instead, a vertical alignment film is first formed in the sub pixel area, and then a horizontal alignment film is coated on the vertical alignment film. Horizontal alignment is realized by implementing a rubbing procedure. Subsequently, the horizontal alignment film on the vertical alignment film in the sub pixel area is removed in a selective manner through an etching procedure, thereby baring the vertical alignment film in the sub pixel area.

It should be noted that, when the main pixel area 100 is in a dark state (a direction of liquid crystal under which is as shown in the drawings), no matter the sub pixel area 200 is at wide viewing angle mode or narrow viewing angle mode, the liquid crystal in the sub pixel area 200 deflects in a direction parallel to an initial direction (dark state) of the liquid crystal in the main pixel area 100. In this case, the sub pixel area 200 would not affect the dark state of the main pixel area 100 under direct view.

In a technical solution according to the present disclosure, on the basis of the above described hybrid aligned pixel units, a bias voltage on each electrode is controlled to form a certain electric field distribution, so that liquid crystal molecules deflect under the force of the electric field, thereby realizing switching between the narrow viewing angle and the wide viewing angle. According to the present embodiment, when bias voltages are exerted on the pixel electrode 110 and the common electrode 120 of the horizontally aligned main pixel area 100, the liquid crystal molecules in the main pixel area 100 would rotate in a plane parallel to the upper substrate and the lower substrate. When bias voltages are exerted on the first upper substrate electrode 211, the second upper substrate electrode 212, the first lower substrate electrode 221, and the second lower substrate electrode 222 of the vertically aligned sub pixel area 200, the liquid crystal molecules in the sub pixel area 200 would rotate in a plane vertical to the upper substrate and the lower substrate.

Working principles of a method for controlling (switching) the viewing angle will be further described in view of embodiment 2 and embodiment 3.

Embodiment 2

As shown in FIG. 3, in embodiment 2, an initial state of the liquid crystal molecules in the sub pixel area as shown in region (a) of FIG. 3 presents a vertical alignment. It should be noted that, the vertical alignment herein refers to a high, near 90° pre-tilt angle of the liquid crystal molecules. According to the present embodiment, a pre-tilt angle is 87°.

Under the narrow viewing angle mode, voltage is exerted only on the electrodes (pixel electrode and/or common electrode) in the main pixel area. Since the main pixel area is horizontally aligned, the liquid crystal molecules in the main pixel area rotate in the plane parallel to the upper substrate and the lower substrate. By controlling the voltage, an angle of rotation of the liquid crystal molecules in the plane parallel to the upper and lower substrates can be changed. In the meantime, since no bias voltage is exerted on the upper substrate electrode and the lower substrate electrode in the sub pixel area, the liquid crystal molecules therein still remains at a high pre-tilt angle. Under such circumstance, when the display device is watched in a wide viewing angle, light leakage from sides of the sub pixel area would occur. Therefore, the liquid crystal display panel can realize narrow viewing angle display.

Of course, if the bias voltage on the upper substrate electrode and the lower substrate electrode in the sub pixel area is too small to enable the liquid crystal molecules to deflect, or to enable the liquid crystal molecules to rotate for a certain angle, but not to a completely horizontal state, light leakage through the sides of the sub pixel area would also occur. In this case, narrow viewing angle of the liquid crystal display panel can also be realized. For example, when the bias voltage exerted on the first upper substrate electrode 211 and the first lower substrate electrode 221 is 0 V, and the bias voltage exerted on the second upper substrate electrode 212 and the second lower substrate electrode 222 is 1.5 V, due to the effect of overlay, the electric field between the upper and lower substrates of the sub pixel area is mainly horizontal components (relatively weak), and vertical components weaken one another due to opposite directions. Under such electric field, the liquid crystal molecules are oblique, but they are not completely horizontal. Therefore, narrow viewing angle display can also be realized, as shown in region (a) of FIG. 4.

When the bias voltages on the upper substrate electrode and the lower substrate electrode of the sub pixel area is constantly increased, horizontal component of the electric field formed between the upper substrate electrode and the lower substrate electrode are also increased. As long as the horizontal component of the electric field formed between the upper substrate electrode and the lower substrate electrode is strong enough, the liquid crystal molecules in the sub pixel area can lie completely in horizontal direction. For example, when the bias voltage exerted on the first upper substrate electrode 211 and the first lower substrate electrode 221 is 0 V, and the bias voltage exerted on the second upper substrate electrode 212 and the second lower substrate electrode 222 is 6 V, the liquid crystal molecules lie completely in horizontal direction, as shown in region (a) of FIG. 5. In this case, light leakage from large viewing angle would not occur, thereby realizing wide viewing angle display of the liquid crystal display panel.

Under no matter wide viewing angle mode or narrow viewing angle mode, the main pixel area is in normal FFS display mode, which belongs to the prior art. Hence, the deflection of the liquid crystal molecules in the main pixel area will not be described in detail.

Embodiment 3

According to embodiment 3, an initial state of the liquid crystal molecules in the sub pixel area presents an oblique alignment. It should be noted that, the oblique alignment herein means that the liquid crystal molecules have a high pre-tilt angle, but are not entirely horizontal. In this case, a principle of switching between the narrowing viewing angle and the wide viewing angle is the same as embodiment 2. The only difference therefrom is a method of exerting bias voltages on the upper substrate electrode and the lower substrate electrode of the sub pixel area.

Under such circumstance, since the initial state of the liquid crystal molecules is oblique alignment, the bias voltages exerted on the upper substrate electrode and the lower substrate electrode of the sub pixel area should enable an electric field to have a strong enough vertical component between the upper substrate electrode and the lower substrate electrode, so that the liquid crystal molecules can stand right up, thereby realizing narrow viewing angle display mode. For example, when the bias voltage exerted on the first upper substrate electrode 211 and the second upper substrate electrode 212 is 3 V, and the bias voltage exerted on the first lower substrate electrode 221 and the second lower substrate electrode 222 is −3 V, the electric field formed between the upper substrate and the lower substrate of the sub pixel area is primarily vertical electric field. Under such electric field, the liquid crystal molecules can stand right up and present a vertical state. In this case, when watching the display screen from a wide viewing angle, light leakage from sides of the sub pixel area would occur, and thus the narrowing viewing angle of the liquid crystal display panel can be realized.

Similar to embodiment 2, by controlling the bias voltages on the upper substrate and the lower substrate of the sub pixel area, the electric field formed therebetween can have a large horizontal component, so that the liquid crystal molecules in the sub pixel area can deflect from an oblique state to a horizontal state. At this time, no light leakage from the sub pixel area under wide viewing angle would occur, thereby realizing wide viewing angle of the liquid crystal display panel.

According to the above embodiments, voltages on the first upper substrate electrode, the second upper substrate electrode, the first lower substrate electrode, and the second lower substrate electrode might not be controlled by transistors, but directly come from a signal line electrically connected thereto.

It should be noted that, the method for adjusting the switching between narrow viewing angle and wide viewing angle according to the present disclosure is not limited to the pixel unit with an FFS mode electrode structure main pixel as shown in FIG. 2. A pixel unit using a main pixel with IPS mode electrode structure can also achieve expected technical effect according to the present disclosure.

Figure 6:
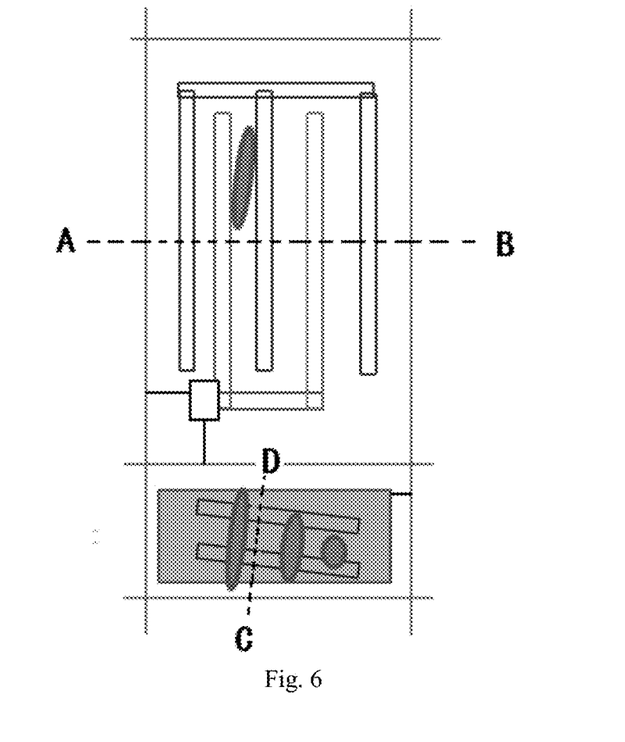
FIG. 6 shows a top view of a pixel unit (a main pixel of which is in IPS mode) according to another embodiment of the present disclosure.

In addition, a structure of pixel for controlling the narrowing viewing angle and the wide viewing angle is not limited to the scenario as shown in FIG. 2 and FIG. 6, a separate viewing angle control pixel can also be arranged. Further, in order to achieve better narrow viewing angle, a color resist does not need to be arranged on a sub pixel unit and the substrate for the viewing angle control pixel. Corresponding position can be hollowed out or arranged as a letter W.

In a word, according to the present disclosure, the upper substrate electrode and the lower substrate electrode of the sub pixel area are configured as double layer electrode structure, so that a horizontal or vertical electric field can be formed. In this case, the liquid crystal molecules can be aligned horizontally, vertically and obliquely, thereby facilitating the switching between the wide viewing angle mode and the narrow viewing angle mode. Compared with the prior art, in the technical solution according to the present disclosure, a better technical effect and a more stable performance can be obtained.

The above embodiments are described only for better understanding, rather than restricting the present disclosure. Any modification or substitution made by one skilled in the art within scope of the technical content disclosed herein is within the scope of the present disclosure.

The invention claimed is:

1. A liquid crystal display panel with adjustable viewing angle, comprising an upper substrate, a lower substrate, and a liquid crystal layer therebetween, wherein:
   a pixel unit located in a display area comprises a main pixel area and a sub pixel area;
   the main pixel area is horizontally aligned;
   the sub pixel area is vertically aligned, and in the sub pixel area, an upper substrate electrode is arranged beneath the upper substrate and a lower substrate electrode is arranged on the lower substrate; and
   in the sub pixel area, the upper substrate electrode and the lower substrate electrode both have a double layer electrode structure and are configured symmetrical with respect to each other, and bias voltages, under an action of which liquid crystal molecules in the sub pixel area are aligned horizontally, vertically and obliquely, are exerted on the upper substrate electrode and the lower substrate electrode, thereby realizing switching between a narrow viewing angle mode and a wide viewing angle mode.

2. The liquid crystal display panel according to claim 1, wherein:
   the double layer electrode structure of the upper substrate electrode comprises a first upper substrate electrode, an insulation layer and a second upper substrate electrode arranged beneath the upper substrate;
   the double layer electrode structure of the lower substrate electrode comprises a first lower substrate electrode, an insulation layer and a second lower substrate electrode arranged on the lower substrate; and
   the first upper substrate electrode and the first lower substrate electrode are both planar electrodes, and the second upper substrate electrode and the second lower substrate electrode are both bar-shaped electrodes.

3. The liquid crystal display panel according to claim 2, wherein under the wide viewing angle mode, in the sub pixel area, bias voltages are exerted on the upper substrate electrode and the lower substrate electrode, so as to form an electric field between the upper substrate electrode and the lower substrate electrode having a strong enough horizontal component, thereby enabling the liquid crystal molecules in the sub pixel area to be aligned horizontally.

4. The liquid crystal display panel according to claim 3, wherein under the wide viewing angle mode, a first bias voltage is exerted on a first upper substrate electrode and a first lower substrate electrode, and a second bias voltage is exerted on a second upper substrate electrode and a second lower substrate electrode.

5. The liquid crystal display panel according to claim 2, wherein under the narrow viewing angle mode,
   if an initial state of the liquid crystal molecules in the sub pixel area is oblique alignment, bias voltages are exerted on the upper substrate electrode and the lower substrate electrode, so as to form an electric field between the upper substrate electrode and the lower substrate electrode having a strong enough vertical component, thereby enabling the liquid crystal molecules in the sub pixel area to be aligned vertically.

6. The liquid crystal display panel according to claim 5, wherein under the narrow viewing angle mode, if the initial state of the liquid crystal molecules in the sub pixel area is oblique alignment, a third bias voltage is exerted on the first upper substrate electrode and the second upper substrate electrode, and a fourth bias voltage is exerted on the first lower substrate electrode and the second lower substrate electrode.

7. The liquid crystal display panel according to claim 3, wherein under the narrow viewing angle mode,
   if an initial state of the liquid crystal molecules in the sub pixel area is oblique alignment, bias voltages are exerted on the upper substrate electrode and the lower substrate electrode, so as to form an electric field between the upper substrate electrode and the lower substrate electrode having a strong enough vertical component, thereby enabling the liquid crystal molecules in the sub pixel area to be aligned vertically.

8. The liquid crystal display panel according to claim 7, wherein under the narrow viewing angle mode, if the initial state of the liquid crystal molecules in the sub pixel area is oblique alignment, a third bias voltage is exerted on the first upper substrate electrode and the second upper substrate electrode, and a fourth bias voltage is exerted on the first lower substrate electrode and the second lower substrate electrode.

9. The liquid crystal display panel according to claim 4, wherein under the narrow viewing angle mode,
   if an initial state of the liquid crystal molecules in the sub pixel area is oblique alignment, bias voltages are exerted on the upper substrate electrode and the lower substrate electrode, so as to form the electric field between the upper substrate electrode and the lower substrate electrode having a strong enough vertical component, thereby enabling the liquid crystal molecules in the sub pixel area to be aligned vertically.

10. The liquid crystal display panel according to claim 9, wherein under the narrow viewing angle mode, if the initial state of the liquid crystal molecules in the sub pixel area is oblique alignment, a third bias voltage is exerted on the first upper substrate electrode and the second upper substrate electrode, and a fourth bias voltage is exerted on the first lower substrate electrode and the second lower substrate electrode.

\* \* \* \* \*

UNITED STATES PATENT AND TRADEMARK OFFICE
CERTIFICATE OF CORRECTION

PATENT NO. : 10,747,034 B2
APPLICATION NO. : 14/907946
DATED : August 18, 2020
INVENTOR(S) : Yuejun Tang Page 1 of 1

It is certified that error appears in the above-identified patent and that said Letters Patent is hereby corrected as shown below:

On the Title Page

Item "(73) Assignee" should read:
Shenzhen China Star Optoelectronics Technology Co., Ltd., Shenzhen, Guangdong (CN); Wuhan China Star Optoelectronics Technology Co., Ltd., Wuhan, Hubei (CN)

Signed and Sealed this
Fifteenth Day of December, 2020

Andrei Iancu
*Director of the United States Patent and Trademark Office*